H. L. DE ZENG.
IRIS DIAPHRAGM.
APPLICATION FILED JAN. 30, 1915.
1,230,568.
Patented June 19, 1917.
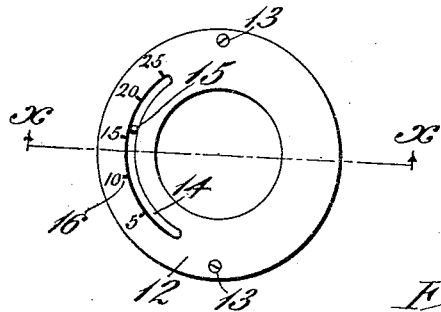
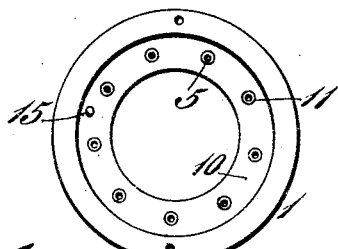
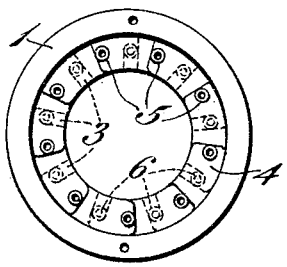
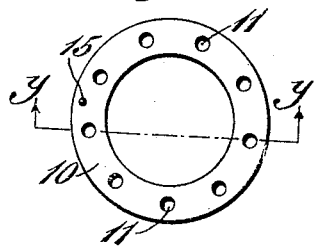
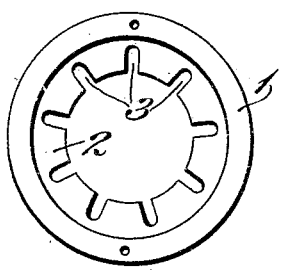
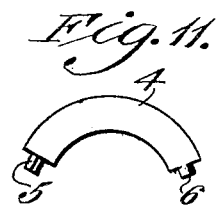
WITNESSES
L. Douville
P. F. Nagle
INVENTOR
Henry L. De Zeng.
BY Wiedersheim & Fairbanks
ATTORNEYS

UNITED STATES PATENT OFFICE.

HENRY L. DE ZENG, OF MAPLE SHADE, NEW JERSEY.

IRIS-DIAPHRAGM.

1,230,568.   Specification of Letters Patent.   Patented June 19, 1917.

Application filed January 30, 1915. Serial No. 5,226.

*To all whom it may concern:*

Be it known that I, HENRY L. DE ZENG, a citizen of the United States, residing at Maple Shade, county of Burlington, State of New Jersey, have invented a new and useful Iris-Diaphragm, of which the following is a specification.

My invention relates to a new and novel iris diaphragm wherein I provide the leaves with integral members projecting from opposite sides thereof.

It further consists of a casing having an integral flange, the leaves having connection with the flange member and with a movable ring member, with one of which members one end of each leaf is connected for radial movement.

It further consists of other novel features all as will be hereinafter set forth.

For the purpose of illustrating my invention, I have shown in the accompanying drawing one form thereof which is at present preferred by me, since the same will give in practice satisfactory and reliable results, although it is to be understood that the same is susceptible of modification in various particulars without departing from the spirit or scope of the invention or sacrificing any of its advantages.

Figure 1 is a top plan view of an iris diaphragm or casing embodying my invention.

Fig. 2 is a sectional view on line $x$—$x$ Fig. 1.

Fig. 3 is a plan view thereof with the closure removed.

Fig. 4 is a plan view thereof with the ring removed.

Fig. 5 is a plan view thereof with the leaves removed.

Fig. 6 is a plan view of the ring in detached position.

Fig. 7 is a sectional view on line $y$—$y$ Fig. 6.

Fig. 8 is a plan view of one of the leaves employed.

Fig. 9 is a side elevation thereof.

Fig. 10 is a plan view of a leaf showing the cuts therein for forming the studs.

Fig. 11 is a plan view showing the tongues rolled inwardly.

Fig. 12 is a side elevation of one end of a leaf with the tongues rolled.

Fig. 13 is an elevation of the same end with the metal bent.

Similar numerals of reference indicate corresponding parts in the figures.

Referring to the drawings:

1 designates a casing or body portion of suitable form but which is preferably circular. Projecting inwardly from the inner wall of the casing and at a suitable point from the outer end thereof is an integral web or flange member 2 which provides a central opening through the casing. At suitable intervals in the flange 2 I provide openings 3 which, as here shown, are in the form of open ended slots extending radially therein.

4 designates the movable leaves which are of suitable shape or form and each of which is provided adjacent its ends with integral members, such as studs 5 and 6, which extend laterally from opposite sides thereof. As here shown, the leaves are of curved form and the studs are formed by slitting the material composing the leaves from opposite sides, adjacent the ends thereof, forming the free tongues 7 and 8, see Fig. 10. The tongues 7 and 8 are curled inwardly toward each other forming the rounded studs and the material is bent in the proper direction at the neck 9 so that a stud extends laterally for each side of the leaf, as will be evident. The leaves are suitably assembled with respect to flange 2 and overlapping each other and so that one stud on each of the leaves is seated in one of the openings 3 of the flange 2 with the leaves resting against the said flange. 10 designates a rotatable ring fitted within the wall of the casing and resting against the leaves which are thus movably interposed between the said ring and the said flange.

At suitable intervals in the ring 10, I provide openings 11 which, as here shown, are circular and each of which is adapted to receive a stud of a leaf, it being understood that the studs are rotatable in the openings. 12 designates a closure for the casing which is secured thereto in any suitable manner, as by screws 13, and which is adapted to hold the parts in suitable movable relation. 14 designates a slot in the closure in which moves a pin 15 which extends therethrough and is connected with the ring 10 for operating the same. Suitable indicators 16 are provided adjacent the slot 14 to indicate the size of the central opening which is varied by the different positions to which the leaves are moved.

The operation of the device will be apparent.

By moving the ring 10 the ends of the leaves which are connected therewith will be moved in the arc of a circle and as the opposite end of each leaf is connected with flange 2 for radial movement, that end of each flange will be moved outwardly so that the combined action of the leaves will be to increase or decrease the central opening depending upon the direction in which the leaves are moved, as will be evident. It will be understood that I do not desire to be limited to the exact construction as shown, since it is only necessary that one end of each of the leaves is connected for radial movement either with the flange or with the ring and that the opposite end of each leaf is connected, either with the flange or the ring, in order to properly move the leaves to cause the same to move in unison to vary the size of the central opening.

Furthermore, the laterally projecting integral members may be made or formed in any suitable or desired manner, since that described is but one of a number of methods which may be employed.

By forming the casing of the construction shown, the same can be made of sheet metal, which, while insuring proper strength, provides a light but durable structure which is of great advantage in this art.

It will now be apparent that I have devised a novel and useful construction of an optical instrument which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. An iris diaphragm, comprising a casing formed from sheet metal and having its upper end deflected downwardly and then laterally to form an internal flange, a rotatable ring provided with openings, leaves each having means at one end to engage said ring openings, said flange coöperating with the other ends of said leaves to position them, and a closure above said ring and seated on said casing.

2. An iris diaphragm, comprising a casing having below its upper end an internal laterally extending flange, a ring rotatable above said flange and having its upper face substantially flush with the top of said casing, leaves connected with said ring, said flange coöperating to position said leaves at one of their ends, and a closure secured to the top of said casing.

HENRY L. DE ZENG.

Witnesses:
C. D. McVay,
M. E. Byrne.

Copies of this patent may be obtained for five cents each, by addressing the "Commissioner of Patents, Washington, D. C."